(12) United States Patent
Yang

(10) Patent No.: US 8,797,279 B2
(45) Date of Patent: *Aug. 5, 2014

(54) ANALOG TOUCHSCREEN METHODS AND APPARATUS

(75) Inventor: Xiao "Charles" Yang, Cupertino, CA (US)

(73) Assignee: mCube Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/787,368

(22) Filed: May 25, 2010

(65) Prior Publication Data

US 2011/0291981 A1    Dec. 1, 2011

(51) Int. Cl.
*G06F 3/041*    (2006.01)

(52) U.S. Cl.
USPC .......................................... 345/173; 257/414

(58) Field of Classification Search
CPC ..... G06F 3/041; G06F 3/0412; G06F 3/0414; G06F 3/044; G06F 3/045; G06F 2203/041; G06F 2203/04101; G06F 2203/04103; G06F 3/04105; H01L 41/00; H01L 41/08; H01L 41/0805; H01L 41/081; H01L 41/0815; H01L 41/082; H01L 41/0825; H01L 41/083; H01L 41/113; H01L 27/20
USPC .................... 345/173–187; 178/18.01–19.07; 708/131, 142–146; 341/22–34; 340/7.1, 407.1–407.2; 257/414–427, 257/173–184
See application file for complete search history.

(56) References Cited

U.S. PATENT DOCUMENTS

| | | | |
|---|---|---|---|
| 3,614,677 A | 10/1971 | Wilfinger | |
| 4,954,698 A | 9/1990 | Yasunaga et al. | |
| 5,140,745 A | 8/1992 | McKenzie | |
| 5,157,841 A | 10/1992 | Dinsmore | |
| 5,173,597 A | 12/1992 | Anglin | |
| 5,488,765 A | 2/1996 | Kubota et al. | |
| 5,493,769 A | 2/1996 | Sakai et al. | |
| 5,610,414 A | 3/1997 | Yoneda et al. | |
| 5,668,033 A | 9/1997 | Ohara | |
| 5,729,074 A | 3/1998 | Shiomi et al. | |
| 6,046,409 A | 4/2000 | Ishii et al. | |
| 6,076,731 A | 6/2000 | Terrell | |
| 6,115,261 A | 9/2000 | Platt et al. | |

(Continued)

OTHER PUBLICATIONS

Notice of Allowance for U.S. Appl. No. 12/940,023, mailed on Apr. 16, 2012, 8 pages.

(Continued)

*Primary Examiner* — Liliana Cerullo
(74) *Attorney, Agent, or Firm* — Kilpatrick Townsend & Stockton LLP

(57) ABSTRACT

A computer implemented method for determining an intensity of user input to a computer system, performed by the computer system that is programmed to perform the method includes determining by a display, an indication of a finger position a user in response to a change in finger position relative to the computer system, wherein change in fin position is also associated with a magnitude of change, determining by a physical sensor of the computer system, the magnitude of change in response to the change in finger position, determining by the computer system, a user selection of a function to perform in response to the indication of the finger position, determining by the computer system, an input parameter associated with the function in response to the magnitude of change, and initiating performance by the computer system, of the function in response to the input parameter.

8 Claims, 17 Drawing Sheets

Bondpad open (subsequent wafer bumping for BGA optional)

Bond pad

(56) References Cited

U.S. PATENT DOCUMENTS

| | | |
|---|---|---|
| 6,188,322 B1 | 2/2001 | Yao |
| 6,263,736 B1 | 7/2001 | Thunder et al. |
| 6,278,178 B1 | 8/2001 | Kwon et al. |
| 6,480,699 B1 | 11/2002 | Lovoi |
| 6,483,172 B1 | 11/2002 | Cote |
| 6,485,273 B1 | 11/2002 | Goodwin-Johansson |
| 6,534,726 B1 | 3/2003 | Okada et al. |
| 6,576,999 B2 | 6/2003 | Sakai et al. |
| 6,656,604 B2 | 12/2003 | Hasewaga |
| 6,753,664 B2 | 6/2004 | Neufeld et al. |
| 6,855,572 B2 | 2/2005 | Jeung et al. |
| 6,912,336 B2 | 6/2005 | Ishii |
| 6,933,165 B2 | 8/2005 | Musolf et al. |
| 6,979,872 B2 | 12/2005 | Borwick |
| 7,019,434 B2 | 3/2006 | Helmbrecht |
| 7,095,226 B2 | 8/2006 | Wan et al. |
| 7,145,555 B2 | 12/2006 | Taylor et al. |
| 7,183,630 B1 | 2/2007 | Fogelson et al. |
| 7,193,312 B2 | 3/2007 | Boon et al. |
| 7,195,945 B1 | 3/2007 | Edelstein et al. |
| 7,239,000 B2 | 7/2007 | Witcraft |
| 7,253,079 B2 | 8/2007 | Hanson et al. |
| 7,258,009 B2 | 8/2007 | Imai |
| 7,358,724 B2 | 4/2008 | Taylor et al. |
| 7,370,530 B2 | 5/2008 | DCamp et al. |
| 7,391,091 B2 | 6/2008 | Tondra et al. |
| 7,402,449 B2 | 7/2008 | Fukuda et al. |
| 7,430,674 B2 | 9/2008 | Van Mueller et al. |
| 7,453,269 B2 | 11/2008 | Won et al. |
| 7,454,705 B2 | 11/2008 | Cadez et al. |
| 7,456,042 B2 | 11/2008 | Stark |
| 7,493,496 B2 | 2/2009 | Smith et al. |
| 7,498,715 B2 | 3/2009 | Yang |
| 7,511,379 B1 | 3/2009 | Flint |
| 7,514,760 B1 | 4/2009 | Quevy |
| 7,521,783 B2 | 4/2009 | Tsai et al. |
| 7,536,909 B2 | 5/2009 | Zhao et al. |
| 7,585,750 B2 | 9/2009 | Do et al. |
| 7,599,277 B1 | 10/2009 | Kato et al. |
| 7,612,443 B1 | 11/2009 | Bernstein et al. |
| 7,671,478 B2 | 3/2010 | Wathanawasam et al. |
| 7,676,340 B2 | 3/2010 | Yasui |
| 7,690,255 B2 | 4/2010 | Gogoi et al. |
| 7,708,189 B1 | 5/2010 | Cipriano |
| 7,713,785 B1 | 5/2010 | Flint |
| 7,779,689 B2 | 8/2010 | Li et al. |
| 7,814,791 B2 | 10/2010 | Andersson et al. |
| 7,814,792 B2 | 10/2010 | Tateyama et al. |
| 7,814,793 B2 | 10/2010 | Sato |
| 7,861,422 B2 | 1/2011 | MacDonald |
| 7,891,103 B2 | 2/2011 | Mayor et al. |
| 8,011,577 B2 | 9/2011 | Mullen et al. |
| 8,016,191 B2 | 9/2011 | Bonalle et al. |
| 8,037,758 B2 | 10/2011 | Sato |
| 8,056,412 B2 | 11/2011 | Rutkiewicz et al. |
| 8,061,049 B2 | 11/2011 | Mayor et al. |
| 8,070,055 B2 | 12/2011 | Block et al. |
| 8,087,296 B2 | 1/2012 | Ueda et al. |
| 8,140,358 B1 | 3/2012 | Ling et al. |
| 8,148,808 B2 | 4/2012 | Braden et al. |
| 8,165,323 B2 | 4/2012 | Zhou |
| 8,181,874 B1 | 5/2012 | Wan et al. |
| 8,227,285 B1 | 7/2012 | Yang |
| 8,236,577 B1 | 8/2012 | Hsu |
| 8,245,923 B1 | 8/2012 | Merrill et al. |
| 8,250,921 B2 | 8/2012 | Nasiri et al. |
| 8,259,311 B2 | 9/2012 | Petschko |
| 8,324,047 B1 | 12/2012 | Yang |
| 8,342,021 B2 | 1/2013 | Oshio |
| 8,367,522 B1 | 2/2013 | Yang |
| 8,395,252 B1 | 3/2013 | Yang |
| 8,395,381 B2 | 3/2013 | Lo |
| 8,402,666 B1 | 3/2013 | Hsu et al. |
| 8,407,905 B1 | 4/2013 | Hsu et al. |
| 8,421,082 B1 | 4/2013 | Yang |
| 8,476,084 B1 | 7/2013 | Yang et al. |
| 8,476,129 B1 | 7/2013 | Jensen et al. |
| 8,477,473 B1 | 7/2013 | Koury et al. |
| 8,486,723 B1 | 7/2013 | Wan et al. |
| 2001/0053565 A1 | 12/2001 | Khoury |
| 2002/0072163 A1 | 6/2002 | Wong et al. |
| 2002/0134837 A1 | 9/2002 | Kishon |
| 2003/0058069 A1 | 3/2003 | Schwartz et al. |
| 2003/0095115 A1* | 5/2003 | Brian et al. ............... 345/179 |
| 2003/0133489 A1 | 7/2003 | Hirota et al. |
| 2003/0184189 A1 | 10/2003 | Sinclair |
| 2003/0230802 A1 | 12/2003 | Poo et al. |
| 2004/0002808 A1 | 1/2004 | Hashimoto et al. |
| 2004/0016995 A1 | 1/2004 | Kuo et al. |
| 2004/0017644 A1 | 1/2004 | Goodwin-Johansson |
| 2004/0056742 A1 | 3/2004 | Dabbaj |
| 2004/0063325 A1 | 4/2004 | Urano et al. |
| 2004/0104268 A1 | 6/2004 | Bailey |
| 2004/0113246 A1 | 6/2004 | Boon |
| 2004/0119836 A1 | 6/2004 | Kitaguchi et al. |
| 2004/0140962 A1* | 7/2004 | Wang et al. ............... 345/179 |
| 2004/0177045 A1 | 9/2004 | Brown |
| 2004/0207035 A1 | 10/2004 | Witcraft et al. |
| 2004/0227201 A1* | 11/2004 | Borwick et al. ........... 257/414 |
| 2005/0074147 A1 | 4/2005 | Smith et al. |
| 2005/0090038 A1 | 4/2005 | Wallace |
| 2005/0174338 A1 | 8/2005 | Ing |
| 2005/0199791 A1 | 9/2005 | Sengoku et al. |
| 2005/0247787 A1 | 11/2005 | Von Mueller et al. |
| 2006/0049826 A1 | 3/2006 | Daneman et al. |
| 2006/0081954 A1 | 4/2006 | Tondra et al. |
| 2006/0141786 A1 | 6/2006 | Boezen et al. |
| 2006/0168832 A1 | 8/2006 | Yasui et al. |
| 2006/0192465 A1 | 8/2006 | Kornbluh et al. |
| 2006/0208326 A1 | 9/2006 | Nasiri et al. |
| 2006/0211044 A1 | 9/2006 | Green |
| 2006/0238621 A1 | 10/2006 | Okubo et al. |
| 2006/0243049 A1 | 11/2006 | Ohta et al. |
| 2006/0274399 A1 | 12/2006 | Yang |
| 2007/0046239 A1 | 3/2007 | Hashizume |
| 2007/0132733 A1 | 6/2007 | Ram |
| 2007/0152976 A1* | 7/2007 | Townsend et al. ........... 345/173 |
| 2007/0181962 A1 | 8/2007 | Partridge et al. |
| 2007/0200564 A1 | 8/2007 | Motz et al. |
| 2007/0281379 A1 | 12/2007 | Stark et al. |
| 2008/0014682 A1 | 1/2008 | Yang et al. |
| 2008/0066547 A1 | 3/2008 | Tanaka et al. |
| 2008/0110259 A1 | 5/2008 | Takeno |
| 2008/0119000 A1 | 5/2008 | Yeh et al. |
| 2008/0123242 A1 | 5/2008 | Zhou |
| 2008/0210007 A1 | 9/2008 | Yamaji et al. |
| 2008/0211043 A1 | 9/2008 | Chen |
| 2008/0211113 A1 | 9/2008 | Chua et al. |
| 2008/0211450 A1 | 9/2008 | Yamada et al. |
| 2008/0277747 A1 | 11/2008 | Ahmad |
| 2008/0283991 A1 | 11/2008 | Reinert |
| 2009/0007661 A1* | 1/2009 | Nasiri et al. ............... 73/504.03 |
| 2009/0015251 A1 | 1/2009 | Azumi et al. |
| 2009/0049911 A1 | 2/2009 | Fukuda et al. |
| 2009/0108440 A1 | 4/2009 | Meyer et al. |
| 2009/0115412 A1 | 5/2009 | Fuse |
| 2009/0153650 A1* | 6/2009 | Cho et al. ............... 345/173 |
| 2009/0262074 A1 | 10/2009 | Nasiri et al. |
| 2009/0267906 A1* | 10/2009 | Schroderus ............... 345/173 |
| 2009/0307557 A1 | 12/2009 | Rao et al. |
| 2009/0321510 A1 | 12/2009 | Day et al. |
| 2010/0044121 A1* | 2/2010 | Simon et al. ............... 178/18.03 |
| 2010/0045282 A1 | 2/2010 | Shibasaki et al. |
| 2010/0071467 A1 | 3/2010 | Nasiri et al. |
| 2010/0075481 A1 | 3/2010 | Yang |
| 2010/0083756 A1 | 4/2010 | Merz et al. |
| 2010/0095769 A1 | 4/2010 | Matsumoto et al. |
| 2010/0109102 A1 | 5/2010 | Chen et al. |
| 2010/0171570 A1 | 7/2010 | Chandrahalim |
| 2010/0208118 A1 | 8/2010 | Ueyama |
| 2010/0236327 A1 | 9/2010 | Mao |
| 2010/0248662 A1 | 9/2010 | Sheynblat et al. |
| 2010/0260388 A1 | 10/2010 | Garret et al. |
| 2010/0302199 A1 | 12/2010 | Taylor et al. |

(56) References Cited

U.S. PATENT DOCUMENTS

| | | |
|---|---|---|
| 2010/0306117 A1 | 12/2010 | Terayoko |
| 2010/0307016 A1 | 12/2010 | Mayor et al. |
| 2010/0312519 A1 | 12/2010 | Huang et al. |
| 2011/0131825 A1 | 6/2011 | Mayor et al. |
| 2011/0146401 A1 | 6/2011 | Inaguma et al. |
| 2011/0154905 A1 | 6/2011 | Hsu |
| 2011/0172918 A1 | 7/2011 | Tome |
| 2011/0183456 A1* | 7/2011 | Hsieh et al. .............. 438/53 |
| 2011/0198395 A1 | 8/2011 | Chen |
| 2011/0265574 A1 | 11/2011 | Yang |
| 2011/0266340 A9 | 11/2011 | Block et al. |
| 2011/0312349 A1 | 12/2011 | Forutanpour et al. |
| 2012/0007597 A1 | 1/2012 | Seeger et al. |
| 2012/0007598 A1 | 1/2012 | Lo et al. |
| 2012/0215475 A1 | 8/2012 | Rutledge et al. |

OTHER PUBLICATIONS

Notice of Allowance for U.S. Appl. No. 12/717,070 mailed Mar. 9, 2012, 9 pages.

* cited by examiner

WLP 1ˢᵗ layer
    Endpoint and stop on W or

ANALOG TOUCHSCREEN METHODS AND APPARATUS

CROSS-REFERENCE TO RELATED APPLICATIONS

The present application relates to and incorporates by reference, for all purposes, the following pending patent applications: U.S. patent application Ser. No. 12/490,067, filed Jun. 23, 2009, and U.S. patent application Ser. No. 12/717,070, filed Mar. 3, 2010.

BACKGROUND OF THE INVENTION

Embodiments of the present invention relate to touch screen devices. More specifically, the present invention relates to touch screen devices capable of sensing the force of a touch and methods of use thereof.

The use of touch screen devices and touch user interfaces are now quite common place for consumers: from the signature machine in the checkout isle, to automatic teller machines at banks, to ticketing kiosks at airports, and the like. Touch screen capability is also now quite common in hand-held devices: from the Palm Pilot, to the Google Nexus One, to the Apple iPad, and the like.

Touch capability has typically been enabled for many touch screen devices through the incorporation and use of a resistive sensor network. These sensor networks can sense when a single finger of the user touches the display, or uses a stylus to touch the display.

Drawbacks to touch screen devices incorporating resistive-based sensors determined by the inventor include that if a user inadvertently touches two locations on the touch screen at the same time, the location reported by the touch screen if often incorrect. As such devices typically only support detecting one finger at a time, for example, the reported touch location may be between the two fingers. Another drawback includes that the user has to press down with some force on the touch screen before the touch screen can detect the user touch.

Newer capacitive-based touch screen displays are now more commonly used and address some of the short comings of a resistive-based sensor network. As an example, capacitive-based touch screens can sense the individual locations of fingers when the user touch the display with more than one finger. Accordingly, these devices are often termed "multi-touch" displays. As another example, capacitive-based touch screens do not require the user to press-down upon the touch screen before the finger is sensed.

Drawbacks to the use of capacitive-based touch screens determined by the inventor include that even if a user inadvertently brushes her finger across the touch screen, that accidental swipe may still be sensed as a user input. This is particularly frustrating, for example, when a user is trying to touch-type using a virtual keyboard to input text. In such cases, as the user hovers his fingers over the home row of the virtual keyboard, often his little finger, middle finger, or the like may accidentally touch the surface of the display. These touches are then incorrectly sensed as presses of the virtual keys causing typographical errors.

Although many touch screen devices include automatic spelling/prediction software to attempt to reduce the effect of typographic errors, in many instances, the predicted word is not the word the user wants. Accordingly, the user must constantly watch the touch screen display to monitor the automatic predictions and to select the correct word. These types of interruptions greatly interfere with the text-entry efficiency provided by the user's ability to touch-type.

Additional drawbacks determined by the inventor of resistive and capacitive based touch screen include that the sensed touches are typically binary in nature, i.e. either the finger is not touching or the finger is touching. These types of devices cannot sense the force with which a user touches the touch screen display. From a user point of view, these touch screen devices also do not provide a user with any sensation of pressing a button or key, i.e. they provide no tactile feedback.

One type of touch screen display used by Research In Motion (RIM) to provide the user with tactile feedback was used in the Blackberry Storm series of devices. In these products, one or more micro sensors were placed under the capacitive-based touch screen display. In operation, when the user wanted to make an on-screen selection, the user would press the touch screen display. The touch screen display would then deflect (by about a millimeter) and cause one of the micro sensors to physically click or switch. The physical click would thus provide the user with tactile confirmation of the button press.

Drawbacks to such approaches determined by the inventor, include that such devices were limited to the physical performance of the micro sensors. For example, a user could not type very quickly with such an approach because the user had to pause between key presses to wait until the micro sensors could fully reset before she could press the next key. Further, if the user placed two or more fingers on the touch screen at the same time she depressed the touch screen (activating the micro sensor(s)), it would be unclear which touch screen location or finger the user intended.

From the above, it is desired to have a multi-touch touch screen display without the drawbacks described above.

BRIEF SUMMARY OF THE INVENTION

Embodiments of the present invention relate to touch screen devices. More specifically, the present invention relates to touch screen devices capable of sensing the force of a touch and methods of use thereof.

Various embodiments of the present invention disclose a computer system such as a cell phone, internet access device, media player, or the like having a touch screen display and one or more physical sensors. In operation, when a user touches a location on the touch screen display, the function associated with the touched location is determined. The function may be running of an application program, selection of a function within an application program, and the like. In various embodiments, a type and/or magnitude of movement is determined by the one or more physical sensors also in response to the user touching the touch screen display. Based upon the type and/or magnitude of movement or combinations of movements, an input parameter or value may be determined for use by the selected function. Next, the function is initiated and given the input parameter or value.

Other embodiments of the present invention disclose a computer system such as a tablet computer, a smart phone, cell phone, or the like also having a touch screen display and one or more physical sensors. In operation, when a user touches a location on the touch screen display, the function associated with the touched location is again determined. The function may be running of an application program, selection of a function within an application program, and the like. In various embodiments, a type and/or magnitude of movement is determined by the one or more physical sensors also in response to the user touching the touch screen display. The type and/or magnitude of movement is then compared to one or more thresholds for type and/or magnitude of movement. In various embodiments, if the threshold is not exceeded, the function is uninhibited.

According to one aspect of the invention, a computer implemented method for determining an intensity of user input to a computer system, performed by the computer system that is programmed to perform the method is disclosed. One technique includes determining by a touchscreen display of the computer system, an indication of a position of a first user-controlled user input device relative to the touchscreen display of the computer system in response to a user-initiated change in state of the first user-controlled user input device relative to the computer system, wherein the user-initiated change in state is also associated with a magnitude of change. A process may include determining by a physical sensor of the computer system, the magnitude of change in sensed physical properties by the physical sensor in response to the user-implemented change in state of the first user-controlled user input device relative to the computer system and determining by the computer system, a user selection of a function to perform in response to the indication of the position of the first user-controlled user input device. A method may include determining by the computer system, an input parameter associated with the function in response to the magnitude of change in sensed physical properties, and initiating performance by the computer system, of the function in response to the input parameter.

According to another aspect of the invention, a computing device is disclosed. One apparatus includes a touchscreen display configured to display images to a user and configured to sense a user touch on the touchscreen display and a touchscreen display controller coupled to the touchscreen display, wherein the touchscreen display controller is configured to determine a selected location on the touchscreen display in response to the user touch. One device includes a physical sensor, wherein the physical sensor is configured to sense physical forces acting upon the physical sensor and configured to determine magnitudes of change in physical forces acting upon the physical sensor in response to the user touch. One system includes a processor coupled to the touchscreen display controller and to the physical sensor, wherein the processor is programmed to determine a user-selected function to perform in response to the selected location on the touchscreen display, and wherein the processor is programmed to initiate execution of the user-selected function in response to the magnitudes of change in physical forces.

Various additional objects, features and advantages of the present invention can be more fully appreciated with reference to the detailed description and accompanying drawings that follow

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
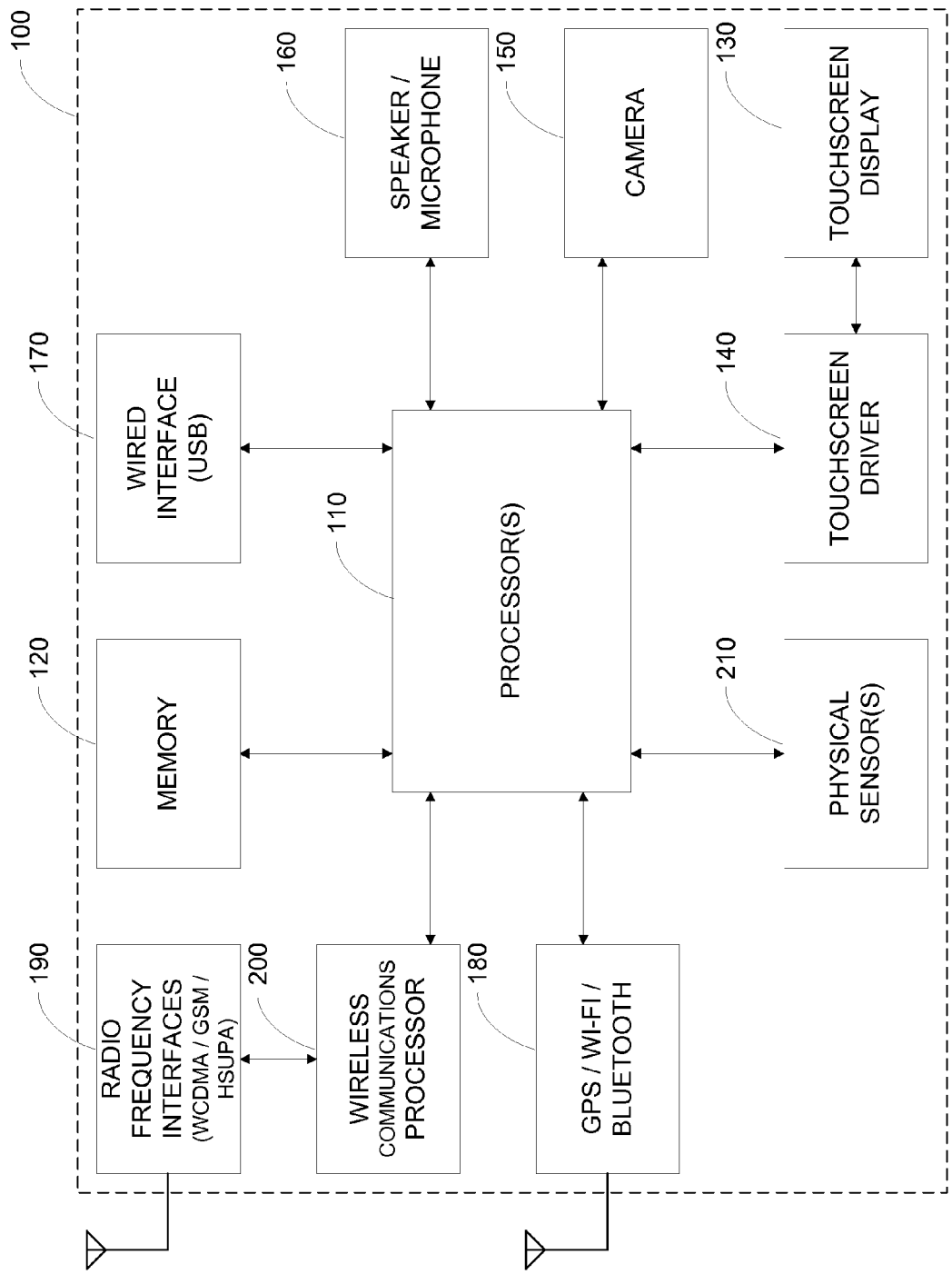
FIG. 1 illustrates a functional block diagram of various embodiments of the present invention.

FIG. 1 illustrates a functional block diagram of various embodiments of the present invention. In FIG. 1, a computing device 100 typically includes an applications processor 110, memory 120, a touch screen display 130 and driver 140, an image acquisition device 150, audio input/output devices 160, and the like. Additional communications from and to computing device are typically provided by via a wired interface 170, a GPS/Wi-Fi/Bluetooth interface 180, RF interfaces 190 and driver 200, and the like. Also included in various embodiments are physical sensors 210.

In various embodiments, computing device 100 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 100 may include one or more processors 110. Such processors 110 may also be termed application processors, and may include a processor core, a video/graphics core, and other cores. Processors 110 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 120 may include different types of memory (including memory controllers), such as flash memory (e.g. NOR, NAND), pseudo SRAM, DDR SDRAM, or the like. Memory 120 may be fixed within computing device 100 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 130 and driver 140 may be based upon a variety of later-developed or current touch screen technology including resistive displays, capacitive displays, optical sensor displays, electromagnetic resonance, or the like. Additionally, touch screen display 130 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 150 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 160 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 110 to enable the user to operate computing device 100 by stating voice commands. Additionally, a speech engine may be provided in various embodiments to enable computing device 100 to provide audio status messages, audio response messages, or the like.

In various embodiments, wired interface 170 may be used to provide data transfers between computing device 100 and an external source, such as a computer, a remote server, a storage network, another computing device 100, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 180 may also be provided to provide wireless data transfers between computing device 100 and external sources, such as computers, storage networks, headphones, microphones, cameras, or the like. As illustrated in FIG. 1, wireless protocols may include Wi-Fi (e.g. IEEE 802.11a/b/g/n, WiMax), Bluetooth, IR and the like.

GPS receiving capability may also be included in various embodiments of the present invention, however is not required. As illustrated in FIG. 1, GPS functionality is included as part of wireless interface 180 merely for sake of convenience, although in implementation, such functionality is currently performed by circuitry that is distinct from the Wi-Fi circuitry and distinct from the Bluetooth circuitry.

Additional wireless communications may be provided via RF interfaces 190 and drivers 200 in various embodiments. In various embodiments, RF interfaces 190 may support any future-developed or conventional radio frequency communications protocol, such as CDMA-based protocols (e.g. WCDMA), GSM-based protocols, HSUPA-based protocols, or the like. In the embodiments illustrated, driver 200 is illustrated as being distinct from applications processor 110. However, in some embodiments, these functionality are provided upon a single IC package, for example the Marvel PXA330 processor, and the like. It is contemplated that some embodiments of computing device 100 need not include the RF functionality provided by RF interface 190 and driver 200.

FIG. 1 also illustrates computing device 100 to include physical sensors 210. In various embodiments of the present invention, physical sensors 210 are multi-axis Micro-Electro-Mechanical Systems (MEMS) based devices being developed by M-cube, the assignee of the present patent application. Physical sensors 210 developed by M-cube currently includes very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof. As described in the patent applications referenced above, various embodiments of physical sensors 210 are manufactured using a foundry-compatible process. As explained in such applications, because the process for manufacturing such physical sensors can be performed on a standard CMOS fabrication facility, it is expected that there will be a broader adoption of such components into computing device 100. In other embodiments of the present invention, conventional physical sensors 210 from Bosch, STMicroelectrnics, Analog Devices, Kionix or the like.

In various embodiments, any number of future developed or current operating systems may be supported, such as iPhone OS (e.g. 4.0), WindowsMobile (e.g. 7), Google Android (e.g. 2.1), Symbian, or the like. In various embodiments of the present invention, the operating system may be a multi-threaded multi-tasking operating system. Accordingly, inputs and/or outputs from and to touch screen display 130 and driver 140 and inputs/or outputs to physical sensors 210 may be processed in parallel processing threads. In other embodiments, such events or outputs may be processed serially, or the like. Inputs and outputs from other functional blocks may also be processed in parallel or serially, in other embodiments of the present invention, such as image acquisition device 150 and physical sensors 210.

FIG. 1 is representative of one computing device 100 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 1. For example, in various embodiments, computing device 100 may lack image acquisition unit 150, or RF interface 190 and/or driver 200, or GPS capability, or the like. Additional functions may also be added to various embodiments of computing device 100, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

FIGS. 2A-D illustrate block diagrams of flow processes according to various embodiments of the present invention. For illustrative purposes only, reference to elements in FIG. 1 are provided in the discussion below merely for the sake of convenience.

In various embodiments of the present invention, physical sensors 210 are provided as part of a computing device 100, step 300. For example, physical sensors 210 provided by the assignee of the present patent application are provided to an assembly entity to form computing device 100. Computing device 100 is then assembled, step 310 and provided for the user, step 320. As described above, in various embodiments, computing device 100 may be a cell-phone, internet access device, a tablet computer, a personal media player/viewer, or the like running an appropriate operating system.

In ordinary use of such a device, computing device 100 (via the operating system) may display any number of graphical user interfaces including user-selectable regions on touch screen display 130, step 320. These user-selectable regions may include radio buttons, sliders, selection buttons, text entry regions and the like. Further, these soft buttons may be associated with application software functions, operating system functions, data management functions, telephony functions, audio processing functions, image processing functions, or the like.

Subsequently, the user determines a function they wish computing device 100 to perform after viewing the graphical user interface, step 340. In various embodiments, the user then touches or contacts a portion of touch screen display 130 corresponding to the user-selectable region, step 350.

Next, in various embodiments of the present invention, the following processes can be performed in parallel by different processing threads, serially by one or more processes, or independently in separate processing threads.

Figure 2A:
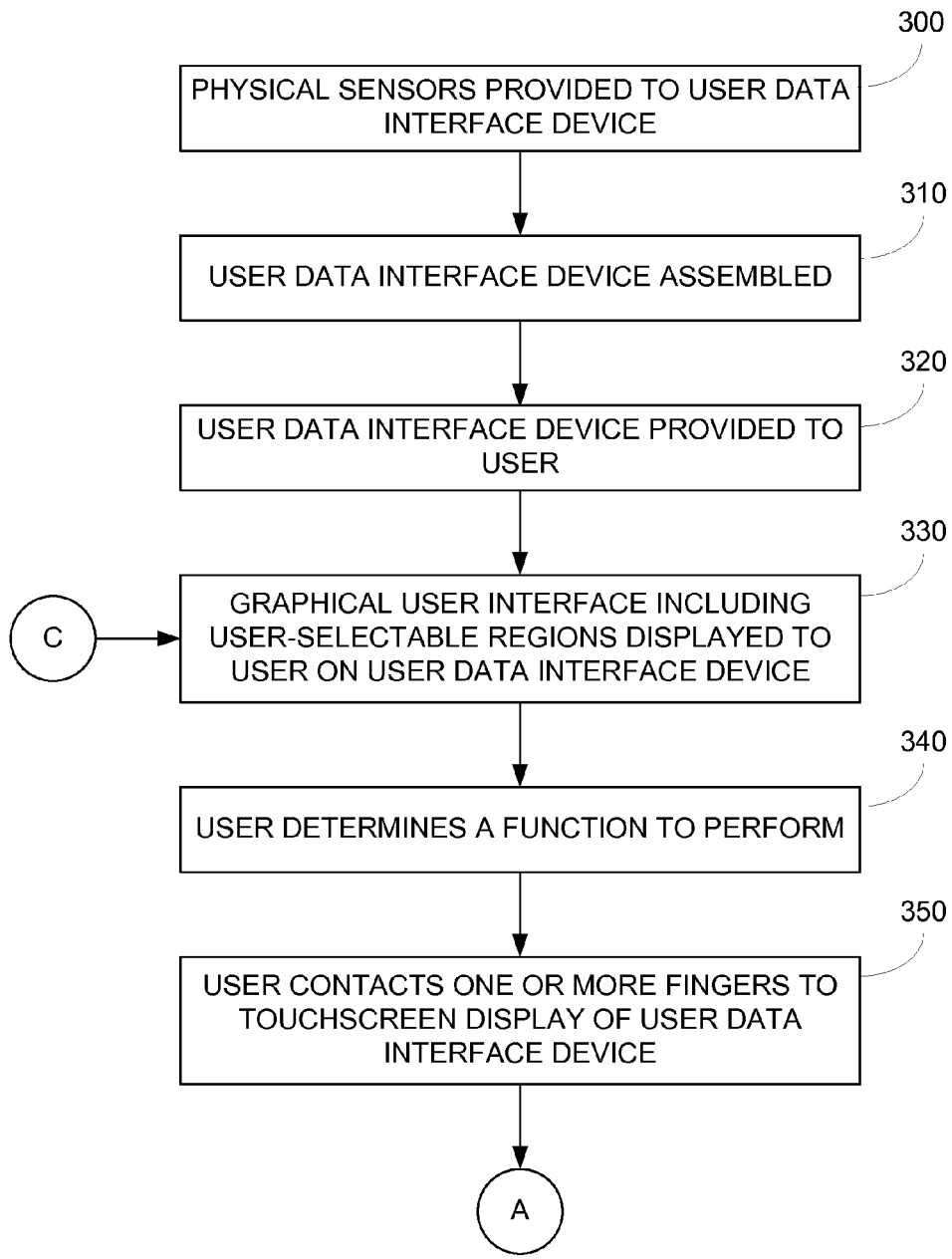
FIGS. 2A-D illustrate block diagrams of flow processes according to various embodiments of the present invention.
Figure 2B:
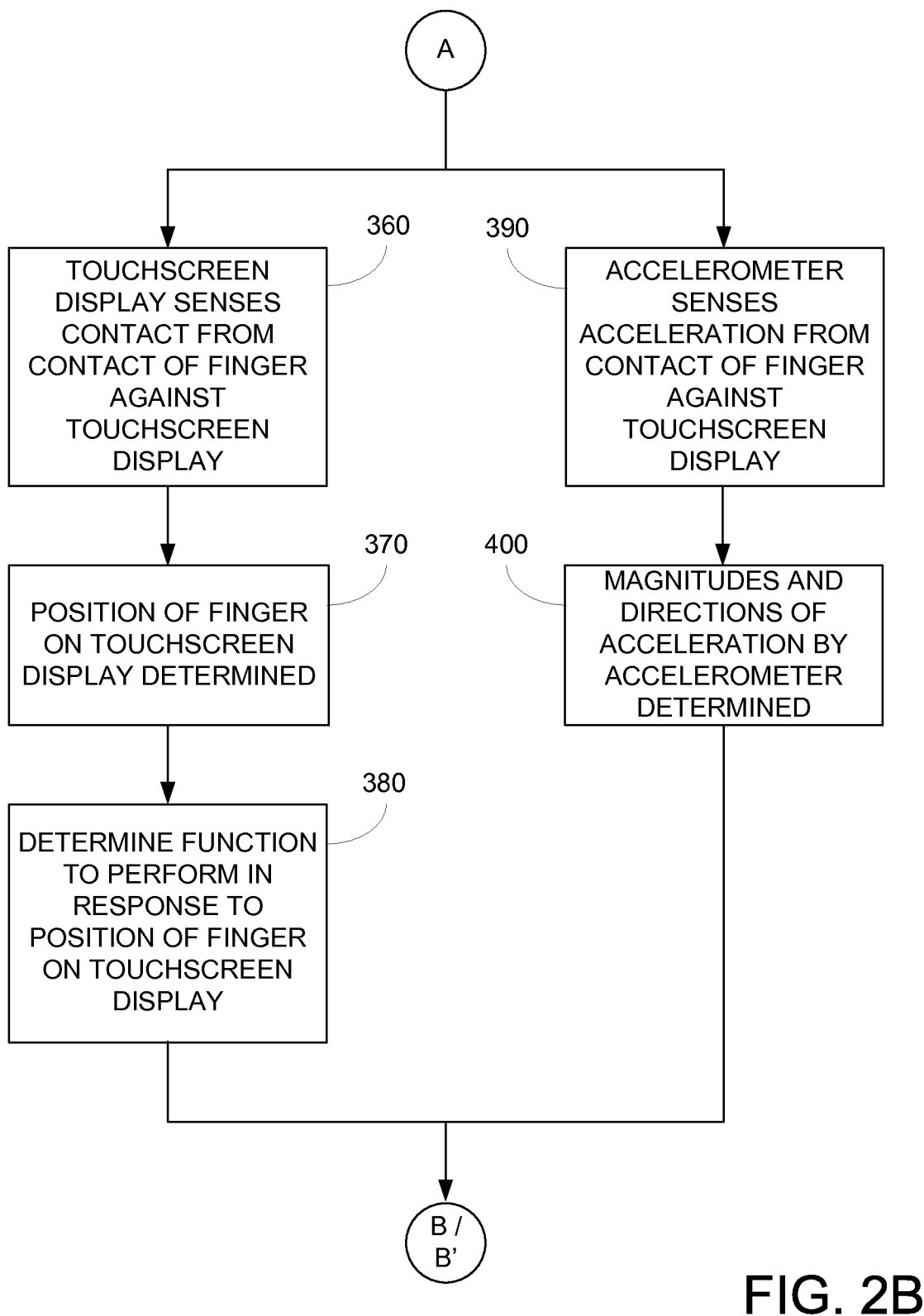

In FIG. 2B, touch screen display 130 senses the user contact in step 360. As described above, in various embodiments, touch screen display 130 may perform this function via the use of resistive sensors, capacitive sensors, or the like. In response to the physical sensor data, the user-selectable region within the GUI is determined, step 370. Next, in various embodiments, computing device 100 then determines one or more functions associated with the user-selectable region, step 380.

In various embodiments of the present invention, it is contemplated that when a user contacts her finger on touch screen display 130 in step 350, computing device 100 (physical sensors 210) will be physically perturbed, step 390. For example, when the user touches touch screen display 130, computing device 100 (physical sensors 210) will be subject to a force (e.g. a change in sensed physical state, a physical perturbation). In various embodiments, this physical change causes physical sensors 210 to sense a change in spatial location (sensed by an accelerometer), causes physical sensors 210 to sense a change its tilt or orientation (sensed by a gyroscope), or the like. For sake of convenience, FIG. 2A merely references use of an accelerometer. In other embodiments, this change causes physical sensors 210 to sense a change in a magnetic field, sense a change in GPS coordinates, sense a change in temperature or air pressure, or the like.

Next, in various embodiments in response to the perturbations of the computing device 100/physical sensors 210, magnitudes and/or directions of the changes are determined in step 400. As described in the above-referenced patent applications, the CMOS foundry-compatible MEMS physical sensor embodiments of the present invention provide a higher level of sensitivity and lower level of noise for such measurements than is currently available.

Figure 2C:
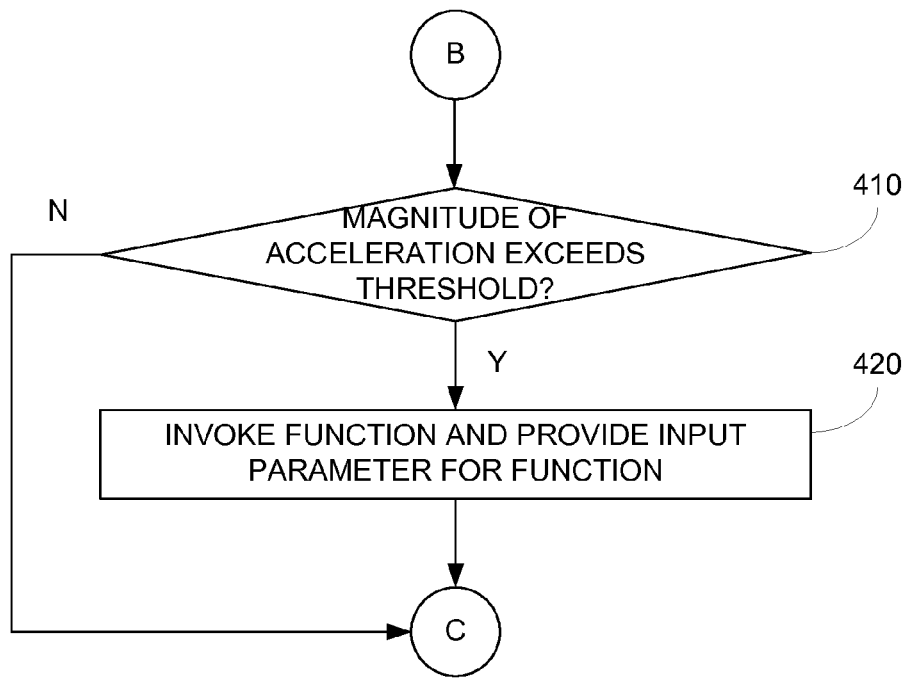
Figure 2D:
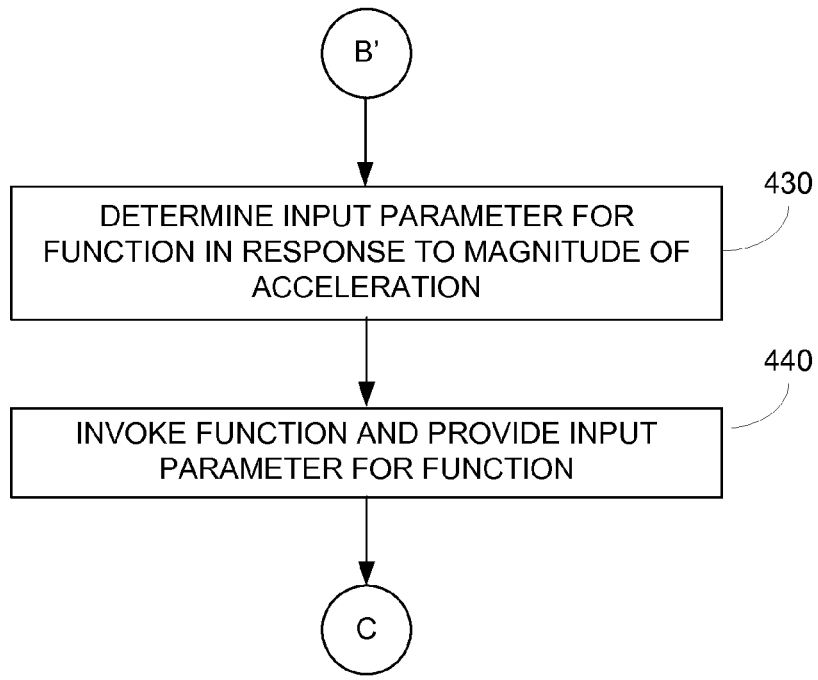

In various embodiments of the present invention, the process may then proceed to FIG. 2C or 2D.

In the example illustrated in FIG. 2C, a determination is then made as to whether the type, magnitude and/or direction of the sensed physical perturbations exceed a predetermined threshold, step 410. In various embodiments, the type of sensed perturbations and the threshold may be predetermined by the operating system, may be set by the user during, for example, a setup phase, may be specified by the application of function or the like.

As various examples, the threshold may be an acceleration in a −z-direction (away from a touch screen display) of 0.1 g, an acceleration in a −z-direction of 0.05 g followed by an acceleration in the +z-direction of 0.03 g; an acceleration of 0.1 g in the −z-direction and accelerations of 0.03 g in the x and y directions; a tilt of 0.5 degrees in a first axis rotation at the same time as a tilt of 1 degree in a second axis of rotation; a tilt of 0.2 degrees in a first axis followed by a tilt of −0.3 degrees in the first axis; a increase in magnetic field by 10 gauss; an increase in atmospheric pressure of 10 mm Hg for 0.25 seconds; and the like. In light of the present patent disclosure, one of ordinary skill in the art will recognize many different thresholds based upon permutations of acceleration, tilts, magnetic fields, pressure, gps coordinates, time, and the like, that are within the scope of embodiments of the present invention.

In various embodiments, if the threshold is exceeded, the function determined in step 380 is performed, step 420; if not, the process returns to step 330. Embodiments may be applied to any number of different functions, for example, a virtual telephone keypad. In typical situations, a user may inadvertently make a telephone call when the cell phone is in his pocket and he reaches for his keys. As his fingers brush against the virtual keypad, the telephone may interpret these as user selections for a telephone number to call. In various embodiments, inadvertent calls may be avoided if it is required that the physical sensors detect an acceleration (e.g. 0.1 g) primarily in the −z direction at about the same time the user touches the virtual keyboard keys. When in his pocket, when the fingers brush or knock against the key pad, the physical sensors may detect an acceleration of 0.05 g in the −z direction, 0.02 in the x direction and 0.05 in the y direction, then, the user touch may be ignored. Accordingly, the execution of unintended user functions on a computing device may be reduced.

In additional embodiments of the present invention, the process of FIG. 2B may proceed to FIG. 2D. In these embodiments a determination is then made as to a value for an input parameter based upon the type, magnitude and/or direction of the sensed physical perturbations, step 430. In various embodiments, a relationship between the type of sensed perturbations and the input parameter may be predetermined by the operating system, may be set by the user during, for example, a setup phase, may be specified by the application of function or the like.

Similar to the embodiment illustrated in FIG. 2C, a number of different thresholds may be used and mapped to different values for the input parameter. In various examples, an acceleration in a −z-direction (away from a touch screen display) of 0.1 g may map to an input value of "1," 0.2 g may map to "2," 0.3 g may map to "3," or the like; an acceleration in only a −z direction of 0.01 g may map to an input value of "256," an acceleration of 0.01 g in the −z direction and 0.05 g in the x-direction may map to an input value of "512;" a clockwise roll of 0.1 degrees may map to an input value of "increase," a counter clock-wise roll of 0.1 degrees may map to an input value of "decrease," or the like.

In response to the value for the input parameter determined, in step 440, the function may be performed using this value. Embodiments may be applied to any number of different functions, for example, a painting program. In such cases, a harder tap may be associated with a larger paint spot upon a canvas, a softer tap may be associated with a smaller spot upon a canvas, and the like. In other embodiments, other types of parameters may also be adjusted based upon sensed physical change such as: position of graphic elements, brightness, contrast, gamma, sharpness, saturation, filter, and the like. As another example, a flick of a finger at a first velocity with a low impact may be associated moving a series of images at a slower rate, a flick of a finger at the first velocity with a higher impact may be associated moving a series of images at a faster rate. In other embodiments, other types of parameters may also be adjusted, such as: rate of acceleration, rate of rotation, rate of zoom, rate of pan, and the like. As another example, the type or magnitude of sensed physical change may control a volume level, a microphone sensitivity level, a bass level, a treble level, or the like. Accordingly, the execution of user functions may have different input parameters of values based upon sensed physical changes.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

Figure 3:
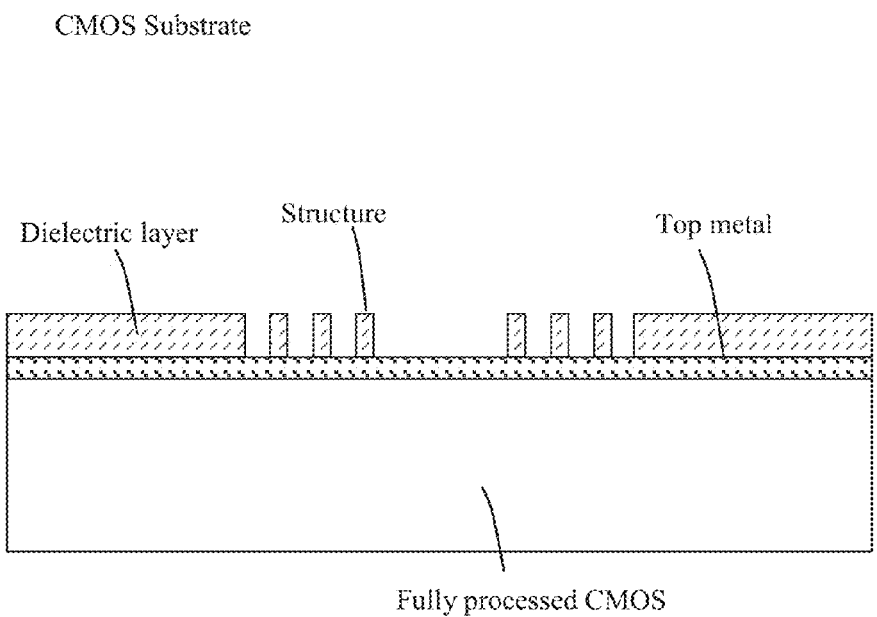
FIG. 3 is a simplified cross section diagram of components of a starting CMOS substrate according to one embodiment of the present invention.

FIG. 3 is a simplified cross section diagram of components of a starting CMOS substrate according to one embodiment of the present invention. As depicted, the starting substrate is a fully processed CMOS wafer. A dielectric layer such as oxide and nitride is deposited on top of a top metal layer of the CMOS wafer. The dielectric layer is then patterned to form a structure that provides anchor points for stationary members of the mechanical sensing device.

Figure 4:
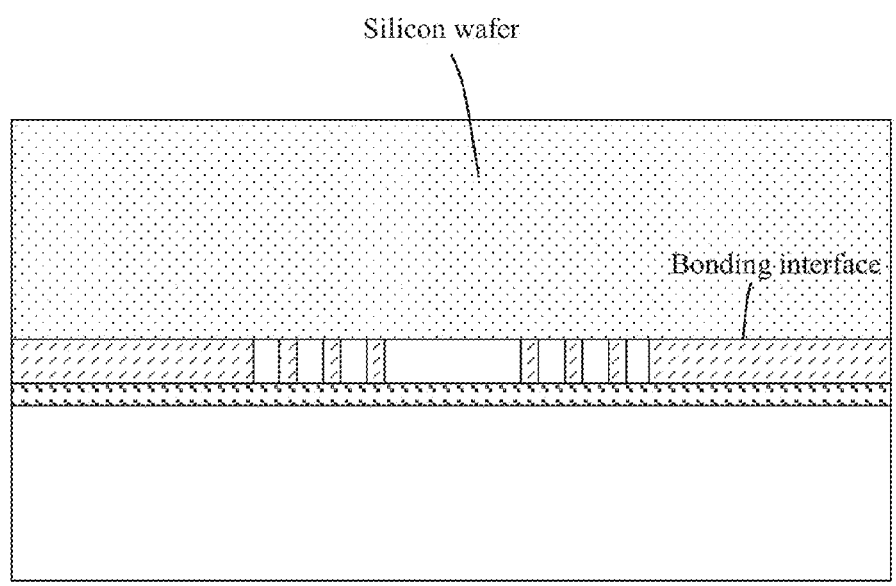
FIG. 4 is a simplified cross section diagram of components of a monolithically integrated inertial sensing device according to one embodiment of the present invention.

FIG. 4 is a simplified cross section diagram of components of a monolithically integrated inertial sensing device according to one embodiment of the present invention. As depicted, a silicon wafer is bonded to the CMOS substrate. The bonding methods include but not limited to: covalent, Sprin-on-glass (SOG), Eutectic, and anodic. The bonding temperature is CMOS compatible and below 400C.

Figure 5:
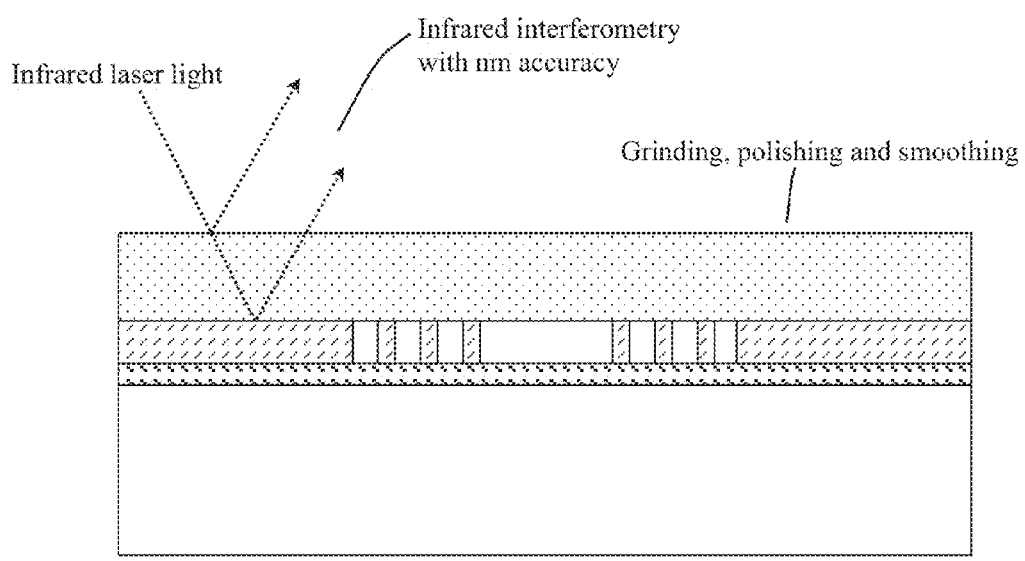
FIG. 5 is a simplified cross section diagram of components of a monolithically integrated inertial sensing device according to one embodiment of the present invention.

FIG. 5 is a simplified cross section diagram of components of a monolithically integrated inertial sensing device according to one embodiment of the present invention. As depicted, the silicon substrate is thinned by techniques such as grinding, polishing, and etching. The final thickness of the remaining silicon atop of the CMOS is precisely measured by infrared interferometry method with nano meter accuracy. Infrared wavelength is used because silicon is transparent in this spectrum.

Figure 6:
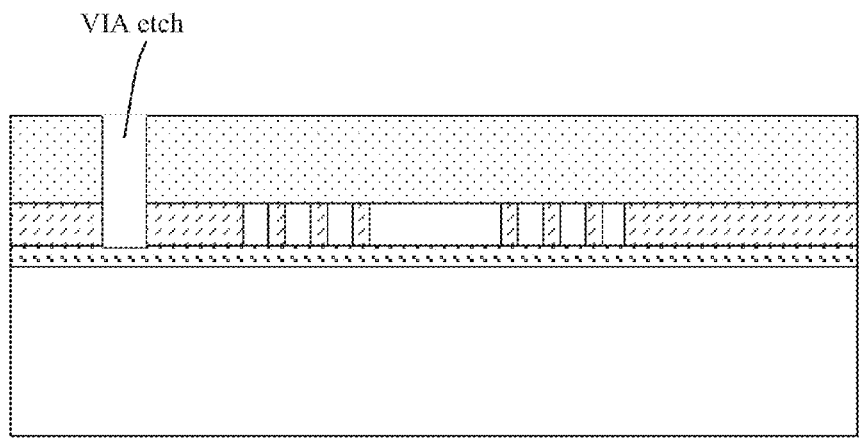
FIG. 6 is a simplified cross section diagram of components of a monolithically integrated inertial sensing device according to one embodiment of the present invention.

FIG. 6 is a simplified cross section diagram of components of a monolithically integrated inertial sensing device according to one embodiment of the present invention. As depicted, a VIA hole is etched into the silicon and top dielectric layers and stop on the top metal layer. The size of the VIA ranges from 0.5 um to a few micro meters depending on the thickness of the silicon layer. The profile or sidewall of the VIA is tapered or slopped for better step coverage of subsequent metalization step.

Figure 7:
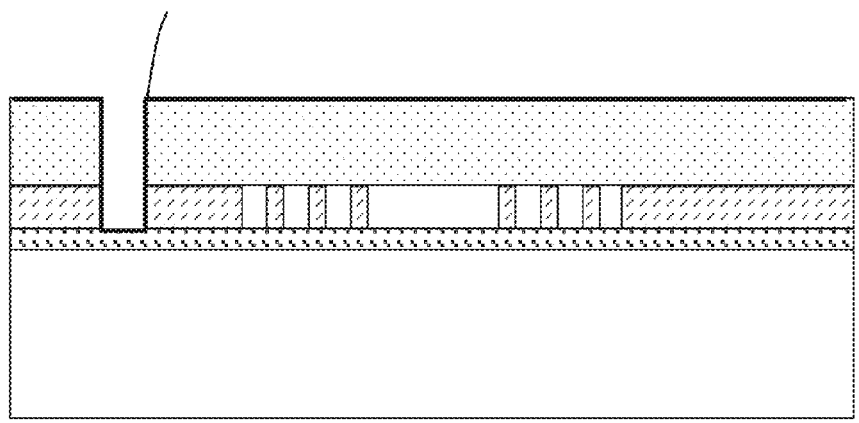
FIG. 7 is a simplified cross section diagram of components of a monolithically integrated inertial sensing device according to one embodiment of the present invention.

FIG. 7 is a simplified cross section diagram of components of a monolithically integrated inertial sensing device according to one embodiment of the present invention. As depicted, a metal layer is blanket deposited on the wafer covering the silicon surface as well as the VIA surface. CVD or PVD recipes are optimized to achieve good step coverage of the VIA as well as low stress of the metal film. In one embodiment, the metal layer is a CVD TiN material that has excellent step coverage of the VIA. The thickness of the metal ranges from a few hundreds of angstroms to a few micro meters depending the applications requirements. An optional electroplating step can be used to fill the entire VIA with metals such as Copper or Nickel.

Figure 8:
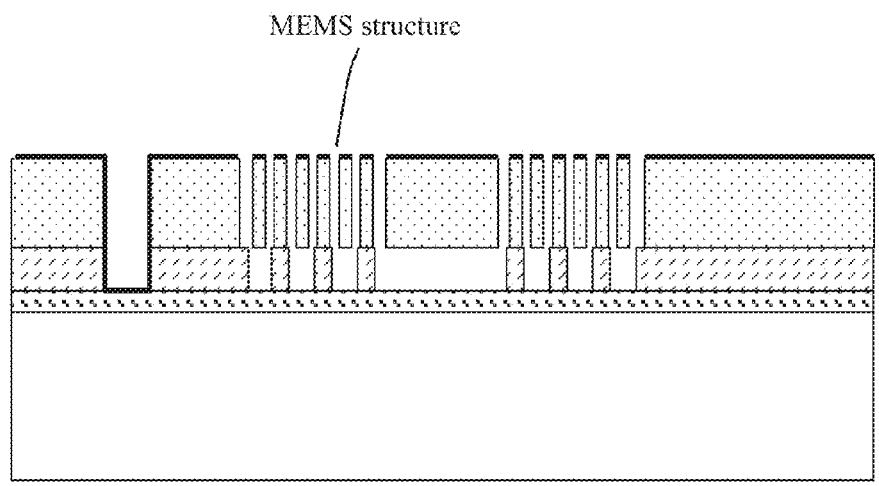
FIG. 8 is a simplified cross section diagram of components of a monolithically integrated inertial sensing device according to one embodiment of the present invention.

FIG. 8 is a simplified cross section diagram of components of a monolithically integrated inertial sensing device according to one embodiment of the present invention. As depicted, the silicon layer is patterned typically by a DRIE step. For a capacitive inertial sensor, the mechanical structure includes a proof mass connected with springs, movable comb fingers and stationary comb fingers that anchored to the top oxide. The springs have desired stiffness/compliance that allows the proof mass to move at certain external acceleration. The comb fingers moving along with the proof mass couples to stationary comb fingers capacitively. The movement causes a change in capacitance between the movable comb fingers and stationary comb fingers. The capacitance change is detected by the integrated circuits a few micrometer below.

Figure 9:
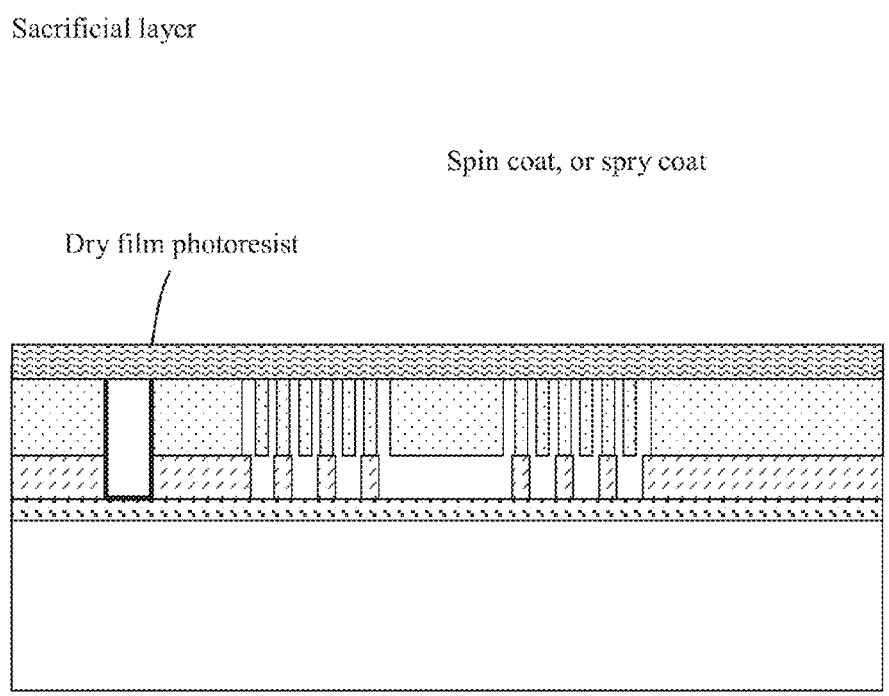
FIG. 9 is a simplified cross section diagram of components of a monolithically integrated inertial sensing device according to one embodiment of the present invention.

FIG. 9 is a simplified cross section diagram of components of a monolithically integrated inertial sensing device according to one embodiment of the present invention. As depicted, an organic sacrificial material is deposited covering the mechanical structure. In one embodiment, the sacrificial material is a liquid photo resist that is spin coated on the wafer and fill all the VIA holes and trenches. In another embodiment, the sacrificial material is a dry film photoresist that is deposited on the surface of the wafer and does not fill the holes and trenches.

Figure 10:
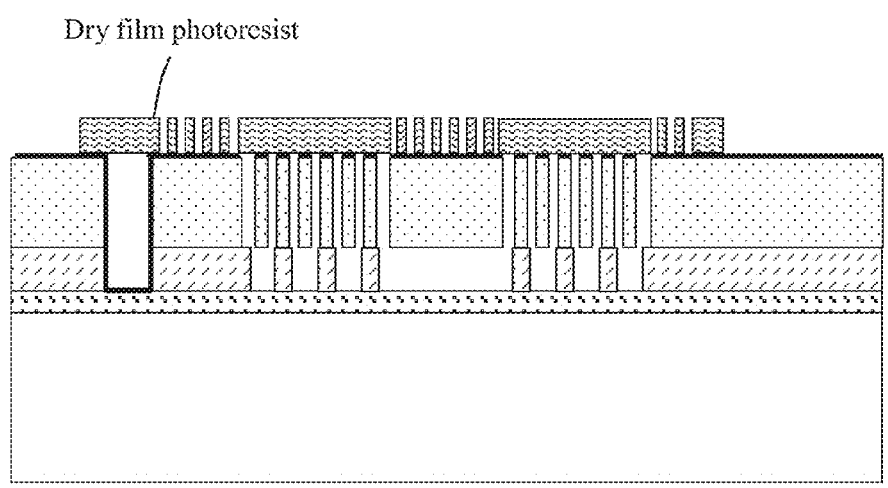
FIG. 10 is a simplified cross section diagram of components of a monolithically integrated inertial sensing device according to one embodiment of the present invention.

FIG. 10 is a simplified cross section diagram of components of a monolithically integrated inertial sensing device according to one embodiment of the present invention. As depicted, the photo resist is patterned by an exposure and develop lithography process. The exposed areas are non-trench features such as proof mass and anchors.

Figure 11:
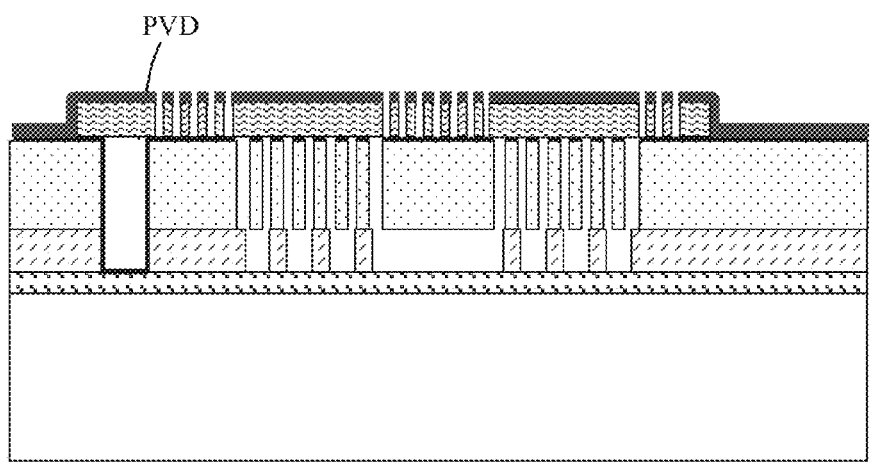
FIG. 11 is a simplified cross section diagram of components of a monolithically integrated inertial sensing device according to one embodiment of the present invention.

FIG. 11 is a simplified cross section diagram of components of a monolithically integrated inertial sensing device according to one embodiment of the present invention. As depicted, the 1$^{st}$ layer of the encapsulation is deposited by a PVD process. The deposition recipe is optimized for non-conforming purpose, which has little step coverage of the sidewall of the exposed photoresist trenches.

Figure 12:
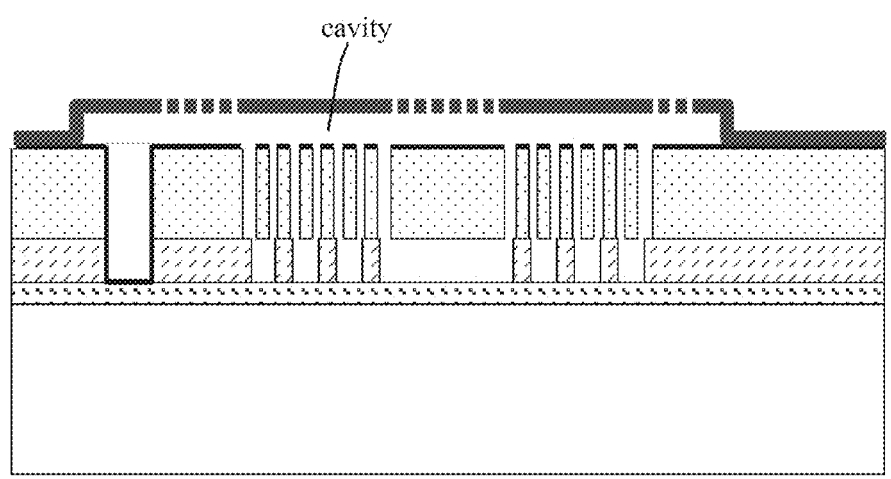
FIG. 12 is a simplified cross section diagram of components of a monolithically integrated inertial sensing device according to one embodiment of the present invention.

FIG. 12 is a simplified cross section diagram of components of a monolithically integrated inertial sensing device according to one embodiment of the present invention. As depicted, the sacrificial organic material is then removed by a dry O2 plasma ashing step. The removal of the sacrificial material releases the sensor device and forms the 1st shell of the encapsulation.

Figure 13:
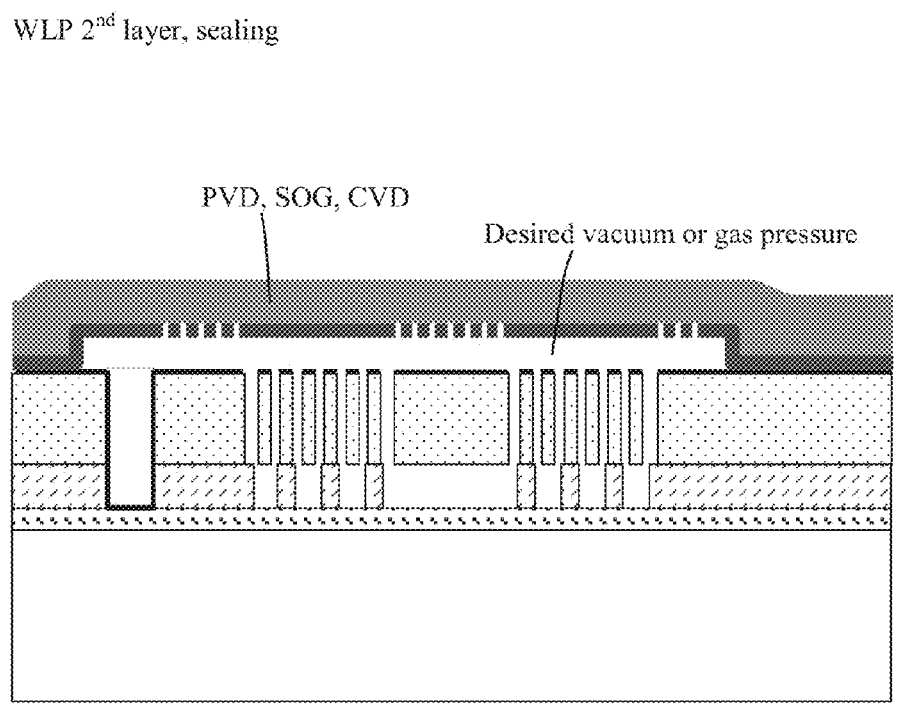
FIG. 13 is a simplified cross section diagram of components of a monolithically integrated inertial sensing device according to one embodiment of the present invention.

FIG. 13 is a simplified cross section diagram of components of a monolithically integrated inertial sensing device according to one embodiment of the present invention. As depicted, the 2nd layer of the encapsulation is deposited onto the 1st layer. The sealing methods include PVD, spin-on, or spray-on techniques. The sealing materials include metal such as Ti, TiN, amorphous silicon, spin-on-glass, spray-on-glass, or a combination of the above. The ambient during sealing is optimized and controlled to a desired spec that defines the sensor device ambient after sealing. A getter material such as Ti can be deposited as the 1st layer of the encapsulation and activated later to achieve high vacuum and cleanness of the sensor ambient environment. After sealing the holes, an optional CVD dielectric material such as oxide or nitride can be added onto the encapsulation.

Figure 14:
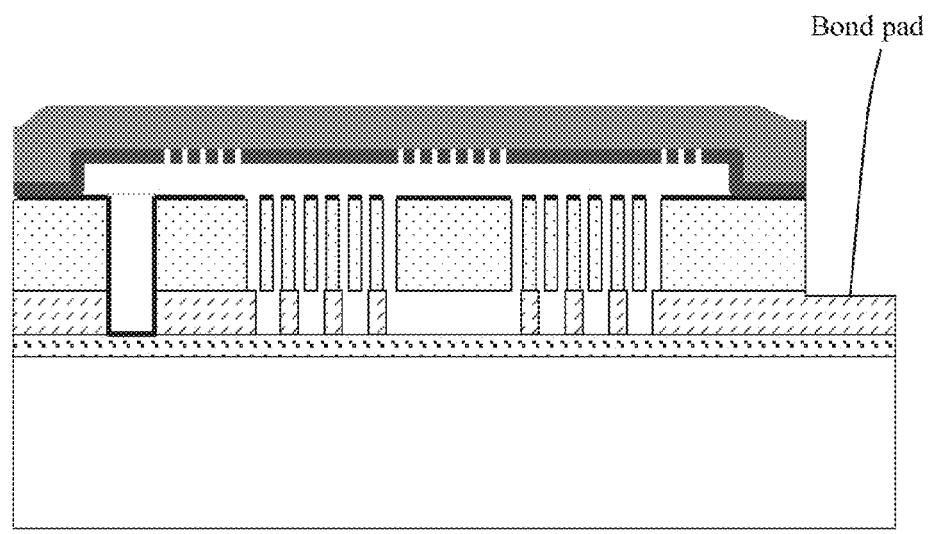
FIG. 14 is a simplified cross section diagram of components of a monolithically integrated inertial sensing device according to one embodiment of the present invention.

FIG. 14 is a simplified cross section diagram of components of a monolithically integrated inertial sensing device according to one embodiment of the present invention. As shown, a bond pad structure is formed. The bond pad structure can be formed by pattern and etch techniques known in the art, but can also be others depending on the application.

Comparing to the incumbent bulk or surface micromachined MEMS inertial sensors, the vertically monolithically integrated inertial sensors have smaller chip size, lower parasitics, higher sensitivity, lower power, and lower cost. Using this architecture and fabrication flow, it is also feasible and cost-effective to make an array of inertial sensors for sensing multiple axes of accelerations on a single chip.

Figure 15:
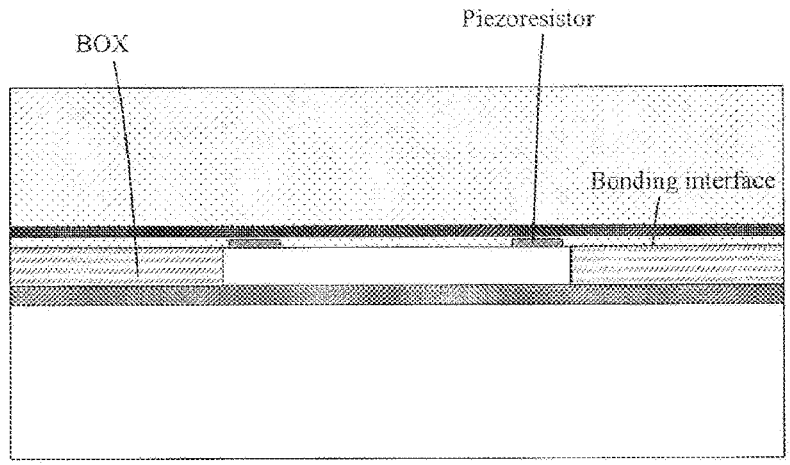
FIGS. 15, 16, and 17 are simplified cross section diagrams of double mechanical layer architecture of a monolithically integrated inertial sensing device according to one embodiment of the present invention.
Figure 16:
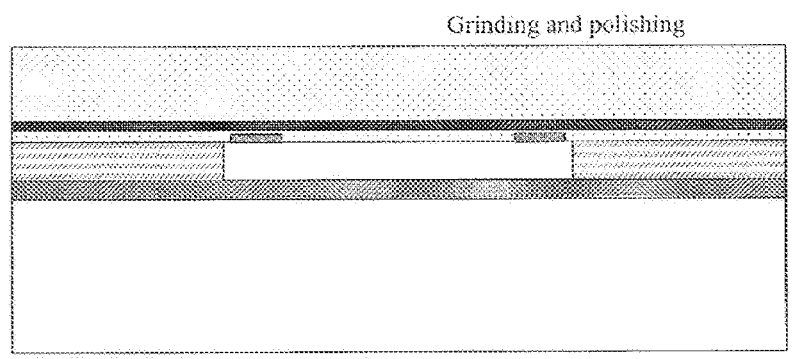
Figure 17:
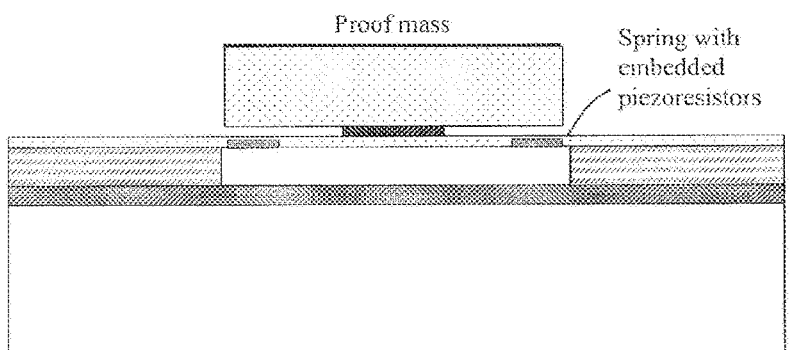

FIGS. 15, 16, and 17 are simplified cross section diagrams of double mechanical layer architecture of a monolithically integrated inertial sensing device according to one embodiment of the present invention. As depicted in FIG. 15, piezoresistors are embedded in the SOI substrate prior to bonding. After the bonding, a thinning process is followed to define a desired thickness of the remaining silicon in the bulk portion of the SOI substrate as illustrated in FIG. 16. The thickness control techniques include methods aforementioned, Infrared interferometry, VIA end-point, or double SOI substrate. As shown in FIG. 17, the sensor structure is then defined by etching steps. The spring member is formed in the SOI layer with the piezoresistors located in the mostly sensitive region. As the proof mass moves responding to an external acceleration, the springs deform accordingly. As a result, the strain generated in the springs change the resistance of the piezoresistors. The change in resistance is detected by the integrated circuits in a few micro below.

In an embodiment, the present invention can include a computing device including a processor coupled to a display, a display controller, and a physical sensor. The physical sensor can include a monolithic MEMS and CMOS integrated circuit device. This integrated circuit device can include a first semiconductor substrate having a first surface region, one or more CMOS integrated circuit devices provided on a CMOS integrated circuit device region having a CMOS surface region overlying the first surface region, and a dielectric region having a cavity region therein overlying the CMOS surface region.

The device can also include a second semiconductor substrate having a second surface region overlying the dielectric region and enclosing the cavity region. The second substrate can have a spring region overlying a vicinity of the cavity region. A first piezo resistor device can be provided within a first portion of the spring region of the second semiconductor substrate. A second piezo resistor device can be provided within a second portion of the spring region of the second semiconductor substrate. A mass of material can be coupled to a portion of the spring region of the second semiconductor substrate between the first and second piezo resistor devices. The mass of material can be configured overlying the cavity region and coupled to the spring region to be movable from at least a first position to a second position and to be sensed respectively by either or both the first and second piezo resistor devices.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   a display configured to display images to a user and configured to sense a user touch on the display;
   a display controller coupled to the display, wherein the display controller is configured to determine a selected location on the display in response to the user touch;
   a physical sensor, wherein the physical sensor is configured to sense physical forces acting upon the physical sensor and configured to determine magnitudes of change in physical forces acting upon the physical sensor in response to the user touch, the physical sensor comprising a monolithic MEMS and CMOS integrated circuit device; and
   a processor coupled to the display controller and to the physical sensor, wherein the processor is programmed to determine a user-selected function to perform in response to the selected location on the display, and wherein the processor is programmed to initiate execution of the user-selected function in response to the magnitudes of change in physical forces exceeding a threshold value;
   wherein the monolithic MEMS and CMOS integrated circuit device comprises:
   a first semiconductor substrate having a first surface region;
   one or more CMOS integrated circuit devices provided on a CMOS integrated circuit device region overlying the first surface region, the CMOs integrated circuit device region having a CMOS surface region;
   a dielectric region overlying the CMOS surface region, the dielectric region having a cavity region provided therein;
   a second semiconductor substrate having a second surface region overlying the dielectric region and enclosing the cavity region, the second semiconductor substrate having a spring region overlying a vicinity of the cavity region;
   a first piezo resistor device provided within a first portion of the spring region of the second semiconductor substrate;
   a second piezo resistor device provided within a second portion of the spring region of the second semiconductor substrate; and
   a mass of material coupled to a portion of the spring region of the second semiconductor substrate between the second piezo resistor device and the first piezo resistor device, the mass material being overlying the cavity region and coupled to the spring region to be movable from at least a first position to a second position and to be sensed respectively by either or both the first piezo resistor device and the second piezo resistor device.

2. The computing device of claim 1 wherein the physical sensor is selected from a group consisting of: an integrated MEMS-CMOS magnetic field sensor, an integrated MEMS-CMOS air pressure sensor.

3. The computing device of claim 2 wherein the threshold value comprises a pressure value determined by the computer system in inches of mercury (Hg).

4. The computing device of claim 2 wherein the threshold value comprises a magnetic field value determined by the computer system in gauss (G).

5. The computing device of claim 1 wherein the display comprises a display selected from a group consisting of: a capacitive display, a resistive display.

6. The computing device of claim 1 wherein the processor is programmed to receive the selected location on the display and the magnitudes of change in the physical forces in a manner selected from a group consisting of: substantially simultaneously, serially.

7. The computing device of claim 1 wherein the physical sensor comprises at least a six-axis MEMS device.

8. The computing device of claim 1 wherein the physical sensor comprises at least a ten-axis MEMS device.

* * * * *